(12) United States Patent
Gerber et al.

(10) Patent No.: US 9,868,155 B2
(45) Date of Patent: Jan. 16, 2018

(54) MONOLITHIC SHROUDED IMPELLER

(71) Applicant: Ingersoll-Rand Company, Davidson, NC (US)

(72) Inventors: Thomas E. Gerber, Williamsville, NY (US); Michael A. Nuchereno, Amherst, NY (US); Noel D. Blair, Jr., Grand Island, NY (US); Robert Small, Williamsville, NY (US)

(73) Assignee: Ingersoll-Rand Company, Davidson, NC (US)

( * ) Notice: Subject to any disclaimer, the term of this patent is extended or adjusted under 35 U.S.C. 154(b) by 749 days.

(21) Appl. No.: 14/220,882

(22) Filed: Mar. 20, 2014

(65) Prior Publication Data

US 2015/0267543 A1 Sep. 24, 2015

(51) Int. Cl.
| | |
|---|---|
| *B22F 5/00* | (2006.01) |
| *F04D 29/02* | (2006.01) |
| *F04D 29/22* | (2006.01) |
| *F04D 29/28* | (2006.01) |
| *B22F 3/10* | (2006.01) |
| *B22F 5/10* | (2006.01) |
| *B22F 3/105* | (2006.01) |

(52) U.S. Cl.
CPC .......... *B22F 5/009* (2013.01); *B22F 3/1055* (2013.01); *F04D 29/023* (2013.01); *F04D 29/2227* (2013.01); *F04D 29/284* (2013.01); *B22F 5/10* (2013.01); *B22F 2998/10* (2013.01); *F05D 2230/22* (2013.01); *F05D 2230/31* (2013.01); *F05D 2230/40* (2013.01); *F05D 2230/53* (2013.01); *Y02P 10/295* (2015.11); *Y10T 29/49336* (2015.01)

(58) Field of Classification Search
CPC .......... B22F 5/009; B22F 5/10; B22F 3/1055; B22F 2998/10; B22F 2003/248; F04D 29/023; F04D 29/284; F04D 29/2227; F05D 2230/31; F05D 2230/53; F05D 2230/40; Y10T 29/49336
See application file for complete search history.

(56) References Cited

U.S. PATENT DOCUMENTS

| | | | |
|---|---|---|---|
| 4,093,401 A | 6/1978 | Gravelle | |
| 4,167,369 A | 9/1979 | Ishihara | |
| 4,227,855 A * | 10/1980 | Flynn | ...................... F01D 5/043 |
| | | | 415/218.1 |
| 4,652,212 A | 3/1987 | Burger et al. | |
| 4,653,976 A | 3/1987 | Blair et al. | |
| 5,112,195 A | 5/1992 | Cox | |
| 5,730,582 A | 3/1998 | Heitmann | |

(Continued)

FOREIGN PATENT DOCUMENTS

WO    2013124314 A1    8/2013

OTHER PUBLICATIONS

International Search Report and Written Opinion, PCT/US15/21719, Jun. 29, 2015, 6 pages.

*Primary Examiner* — Jessica Cahill
*Assistant Examiner* — Daphne M Barry
(74) *Attorney, Agent, or Firm* — Taft Stettinius & Hollister LLP

(57) ABSTRACT

An impeller including a hub body, a shroud surrounding the hub body, and a plurality of impeller blades extending from the hub body to the shroud, wherein the hub body, the shroud, and the plurality of impeller blades are a one-piece structure.

18 Claims, 8 Drawing Sheets

(56) References Cited

U.S. PATENT DOCUMENTS

| | | | |
|---|---|---|---|
| 6,270,914 B1 * | 8/2001 | Ogasawara | C23C 10/28 148/421 |
| 7,147,433 B2 | 12/2006 | Ghizawi | |
| 7,563,074 B2 | 7/2009 | Xu | |
| 7,628,586 B2 | 12/2009 | Feher | |
| 2005/0260074 A1 | 11/2005 | Higashimori | |
| 2009/0110556 A1 | 4/2009 | Jahnz et al. | |
| 2009/0255256 A1 | 10/2009 | McMasters et al. | |
| 2010/0025001 A1 * | 2/2010 | Lee | B22C 7/02 164/23 |
| 2010/0074758 A1 | 3/2010 | Rawdon et al. | |
| 2011/0057056 A1 | 3/2011 | Ziminsky et al. | |
| 2011/0135952 A1 * | 6/2011 | Morris | B22F 3/1055 428/548 |
| 2012/0301287 A1 | 11/2012 | Swiatek et al. | |
| 2013/0001837 A1 | 1/2013 | Gohler et al. | |
| 2013/0039769 A1 * | 2/2013 | Giannozzi | F04D 29/023 416/186 R |
| 2013/0195673 A1 * | 8/2013 | Godfrey | B23P 15/04 416/241 R |

* cited by examiner

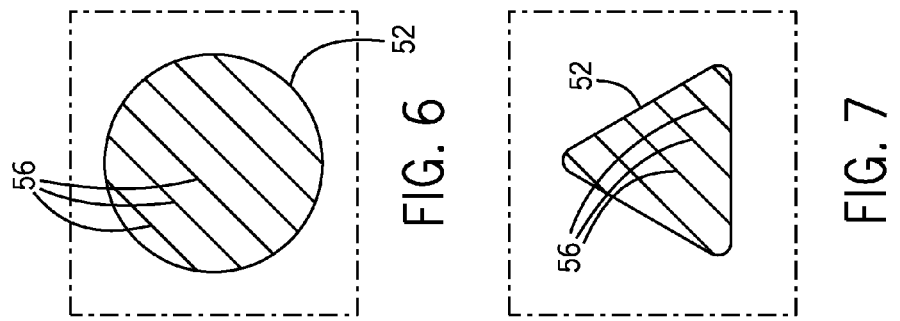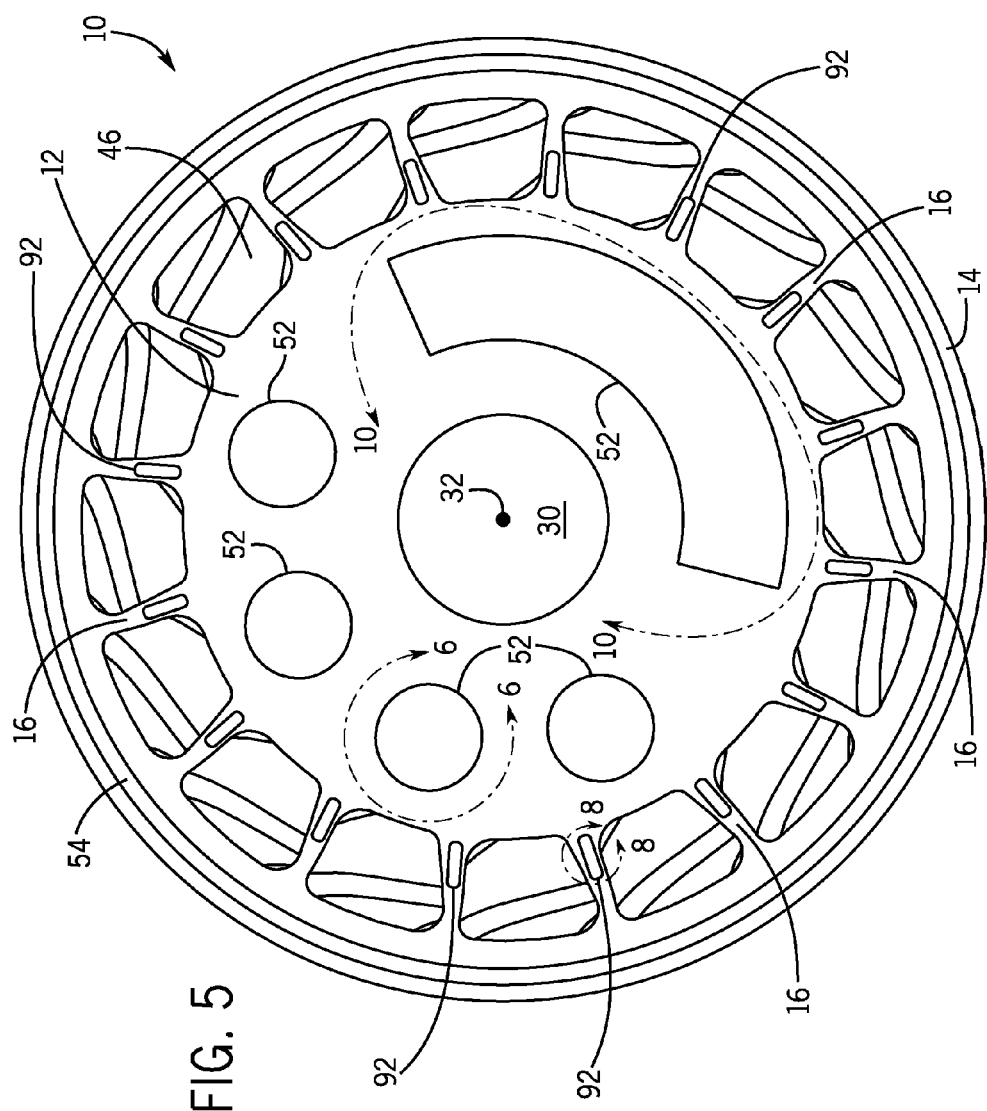

MONOLITHIC SHROUDED IMPELLER

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Centrifugal compressors or pumps may be employed to provide a pressurized flow of fluid for various applications. Such compressors or pumps include an impeller that is driven to rotate by an electric motor, an internal combustion engine, or another drive unit configured to provide a rotational output. As the impeller rotates, fluid entering in an axial direction is accelerated and expelled in a circumferential and a radial direction. The high-velocity fluid then enters a diffuser that converts the velocity head into a pressure head (i.e., decreases flow velocity and increases flow pressure). In this manner, the centrifugal compressor produces a high-pressure fluid output. Unfortunately, existing shrouded impellers are limited in complexity and are manufactured in multiple pieces, which are joined in a later process.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a top cross-sectional view along line 5-5 of an embodiment of the monolithic shrouded impeller in FIG. 1;

FIG. 6 is a sectional view of an embodiment of a void in a hub along line 6-6 of the monolithic shrouded impeller in FIG. 5;

FIG. 7 is a sectional view of an embodiment of a void in a hub along line 6-6 of the monolithic shrouded impeller in FIG. 5;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include a monolithic shrouded impeller formed using an additive manufacturing process (e.g., direct metal laser sintering (DMLS), or digital part materialization (3-D printing)). In other words, the hub, shroud, and blades are formed as one-piece without a separate joining process that joins the hub to the shroud (e.g., welding). A one-piece shrouded impeller increases the structural integrity of the impeller by reducing stress concentrations, enabling the impeller to operate more efficiently by rotating at faster speeds. In addition, the additive manufacturing process enables more complex and customizable one-piece impellers for specific applications or for a specific machine (e.g., 3-D blade geometries, hub geometries, etc. that vary in 1, 2, or 3 directions e.g., radial, axial, and/or circumferential directions). For example, some customization may include "sculpted" blade geometry. As described herein, the term "sculpted" refers to a surface of an impeller blade that is complex and three-dimensional. In other words, the sculpted surface may be formed by connecting two corresponding points on the shroud and hub intersect surfaces with a line that is not a straight line (i.e., the line connecting the two corresponding points is curved). Other customization may include forming voids within the hub, shroud, and/or blades. The voids in the impeller may have different sizes, shapes, and positions. In some embodiments, the one-piece impeller may include supporting ribs that extend through the voids. The supporting ribs may enable larger void formation without sacrificing the structural integrity of the impeller (i.e., the voids reduce the weight of the impeller without negatively affecting the structural integrity).

Figure 1:
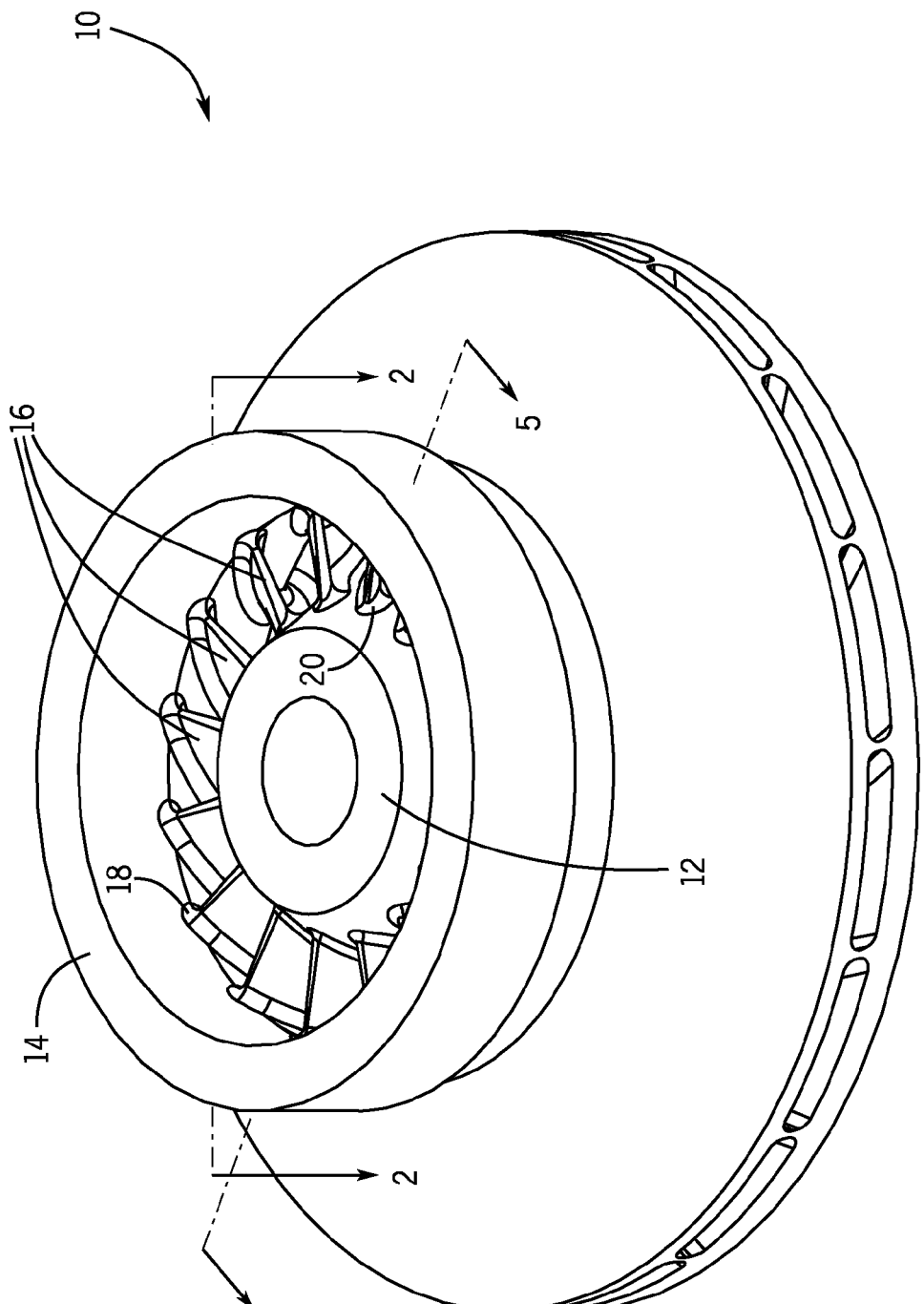
FIG. 1 is a perspective view of an embodiment of a monolithic shrouded impeller.

FIG. 1 is a perspective view of a monolithic shrouded impeller 10. The monolithic shrouded impeller 10 (e.g., a metal, plastic, etc. monolithic shrouded impeller) may be formed using an additive manufacturing process. The additive manufacturing process enables a hub 12, a shroud 14, and impeller blades 16 to be formed as one-piece (i.e., a monolithic piece) without additional joining processes (e.g., welding). These one-piece or monolithic shrouded impellers 10, produced using additive manufacturing, provide several advantages over traditional shrouded impellers produced by casting or machining separate parts before assembly. These advantages include a stress reduction in the connection between the shroud 14 and the hub 12 (e.g., the blades are not welded at the shroud intersect surface 18 and/or the hub intersect surface 20); more complex shapes (e.g., 3-D blade geometries that vary in the radial, axial, and circumferential directions, or lengthwise along the blade); a reduction in weight by including voids in the hub 12, shroud 14, and/or the blades 16; fillets that strengthen the connection of the blades to the hub 12 and shroud 14; and the ability to use different materials in different portions of the shrouded impeller 10.

Figure 2:
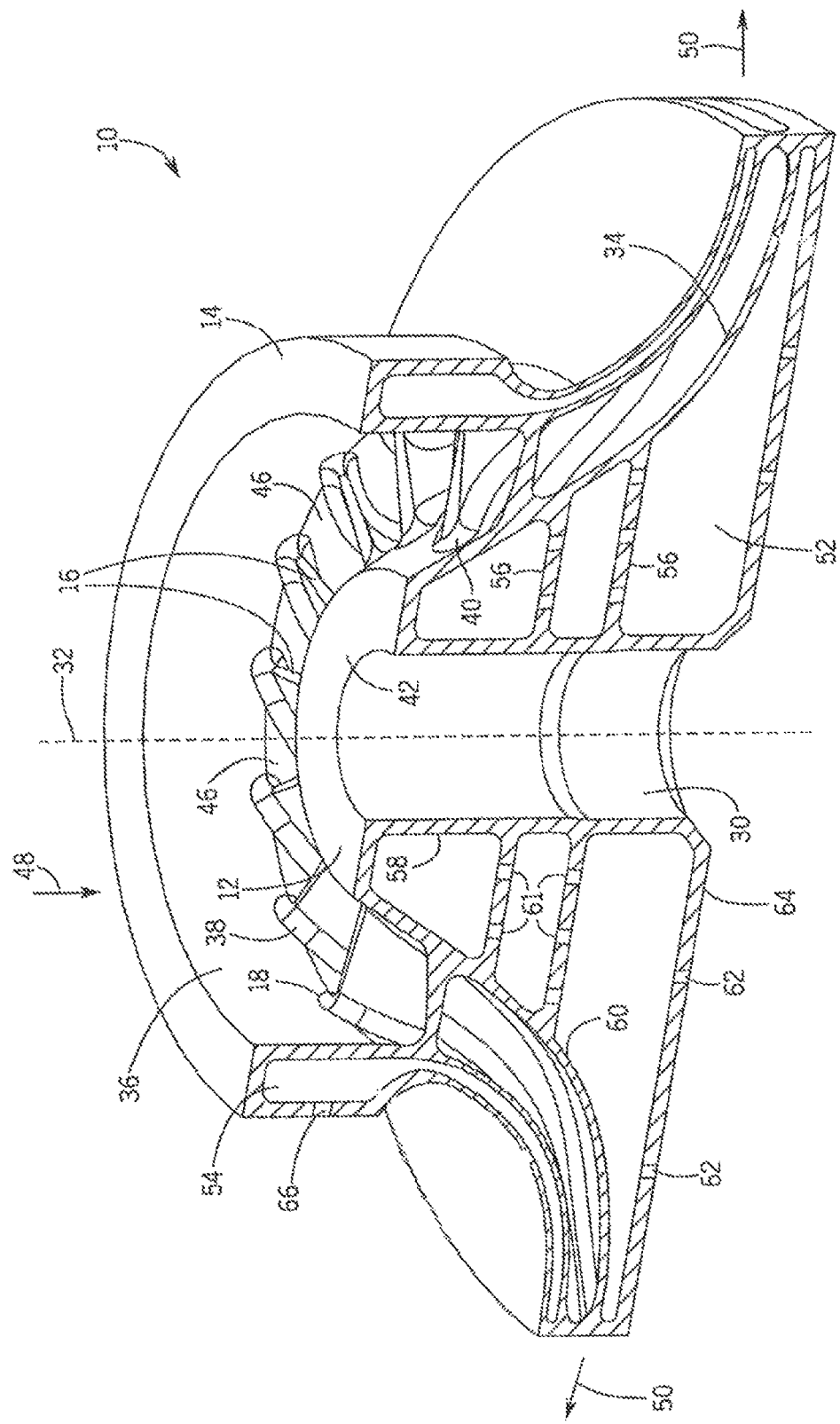
FIG. 2 is a perspective cutaway view along line 2-2 of an embodiment of the monolithic shrouded impeller in FIG. 1.

FIG. 2 is a perspective cut-away view along line 2-2 of the monolithic shrouded impeller 10 in FIG. 1. As illustrated, the monolithic shrouded impeller 10 includes the hub 12 (e.g., annular hub) with an aperture 30 (e.g., central bore). The aperture 30 enables attachment of the monolithic shrouded impeller 10 to a system and rotation of the monolithic shrouded impeller 10 around the axis 32. Surrounding an outer surface 34 of the hub 12 is the shroud 14 (e.g., annular shroud). The shroud 14 couples to the blades 16, which in turn couple to the hub 12. More specifically, the blades 16 couple to an interior surface 36 of the shroud 14 at the shroud intersect surface 18, and to the hub 14 outer surface 34 and at the hub intersect surface 20. In some embodiments, there may be fillets 38 and 40. The fillets 38 and 40 improve the connection between the blades 16 and the hub 12 and/or the blades 16 and the shroud 14; reduce stress on the blades 16; and enable thinner blade construction. As illustrated, the blades 16 are spaced away from one another to form fluid passages 46 that extend through the monolithic shrouded impeller 10. In operation, fluid (e.g., liquid or gas) enters the fluid passages 46 in axial direction 48. As the monolithic shrouded impeller 10 rotates, the fluid is accelerated and then expelled out of the fluid passages 46 in a radial direction 50. As explained above, the monolithic shrouded impeller 10 uses additive manufacturing (e.g., direct metal laser sintering (DMLS), or digital part materialization (3-D printing)) to form the hub 12, the shroud 14, and the blades 16 into a one-piece shrouded impeller without an additional joining process (e.g., welding).

In some embodiments, the monolithic shrouded impeller 10 may include one or more voids 52 in the hub 12 and one or more voids 54 in the shroud 14. The voids 52 and 54 reduce the mass of the monolithic shrouded impeller 10 without decreasing the structural integrity. However, some embodiments may include a voidless monolithic shrouded impeller 10. As illustrated, the hub 12 includes one annular void 52 that extends circumferentially through the hub 12 and forms a shape similar to the hub 12. The shroud 14 may also include an annular void 54. The void 54 in the shroud 14 may be substantially shaped like the shroud 14. In some embodiments, the hub 12 and/or the shroud 14 may include one or more supporting ribs 56 (e.g., 1, 2, 3, 4, 5, 6, 7, 8, 9, 10 or more ribs 56) that increase the structural integrity of the monolithic shrouded impeller 10 while enabling a reduction in mass. In the present embodiment, the supporting ribs 56 extend from the annular interior wall 58 to the outer wall 60 of the hub 12. The ribs 56 may extend completely about the axis 32 (e.g., disk-shaped rib) or only partially about the axis (e.g., sectional pie-shaped ribs). In other words, the monolithic shrouded impeller 10 may include multiple ribs 56 (e.g., 1, 2, 3, 4, 5, 6, 7, 8, 9, 10 or more ribs 56) at the same axial position along the axis 32 that extend only partially about the axis 32. In some embodiments, the disc-shaped ribs 56 described above may include drainage apertures 61. The drainage apertures 61 allow excess unsintered material (e.g., metal particles) used in forming the monolithic shrouded impeller 10 to drain out of the hub 12 through apertures 62 in the bottom surface 64. However, in some embodiments voids 52 and 54 may be formed in the monolithic shrouded impeller 10 without excess unsintered material. Accordingly, some monolithic shrouded impellers may not include drainage apertures 61 or 62. Furthermore, instead of radial ribs 56, the monolithic shrouded impeller 10 may include ribs that extend axially between the top surface 42 to the bottom surface 64 of the hub 12. These axial ribs may also extend circumferentially about the axis 32 to form a supporting cylinder within the void 52 of the hub 12. In some embodiments, the axial ribs may be individual shafts that extend from the top surface 42 to the bottom surface 64. These shafts may be spaced circumferentially around and an equal distance away from the axis 32, or the shafts may be placed in irregular positions within the void 52.

Figure 3:
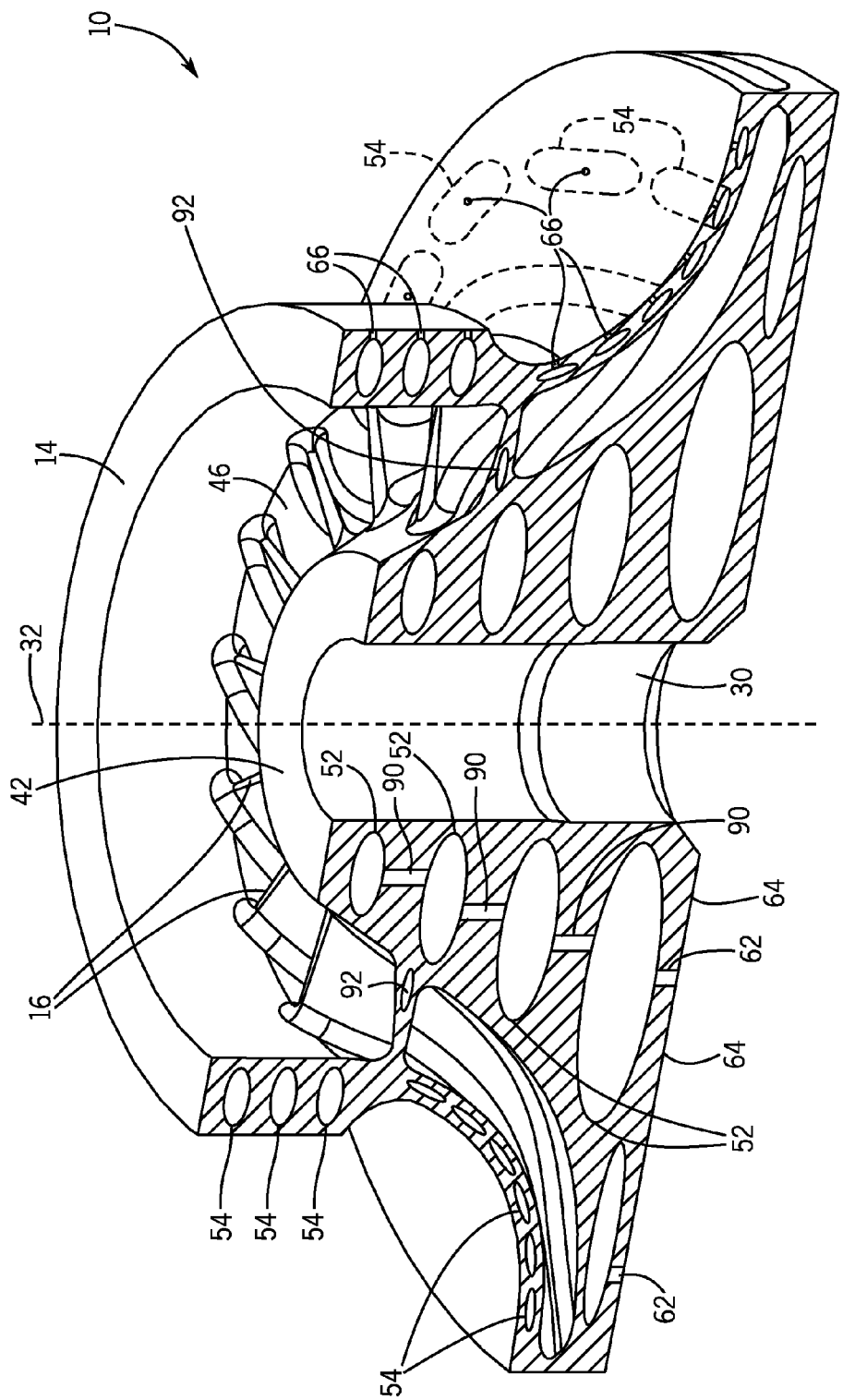
FIG. 3 is a perspective cutaway view along line 2-2 of an embodiment of the monolithic shrouded impeller in FIG. 1.

FIG. 3 is a perspective cutaway view along line 2-2 of the monolithic shrouded impeller 10 in FIG. 1. As illustrated, the hub 12 includes multiple voids 52 that extend radially outward from the axis 32. Each of the voids 52 may extend circumferentially around the axis 32 to form an annular shape, or there may be multiple voids 52 that extend circumferentially about the axis 32. In some embodiments, the voids 52 may fluidly couple to one another with apertures 90. The apertures 90 enable excess material to drain from the voids 52 through apertures 62 in the bottom surface 64 of the hub 12. The shroud 14 may also include multiple voids 54. The voids 54 may also extend circumferentially around the axis 32 to form an annular shape, or there may be multiple voids 54 (e.g., 2, 3, 4, 5, 6, 7, 8, 9, or 10) that extend partially about the axis 32. Each of the voids 54 may include a respective aperture 66 that enables excess material removal after the additive manufacturing process. As illustrated, the blades 16 may also include apertures 92 to reduce the overall weight of the monolithic shrouded impeller 10. In some embodiments, the aperture(s) 92 may extend along the length of the blade 16. In other embodiments, the apertures 92 may placed at discrete locations along the length of the blade.

Figure 4:
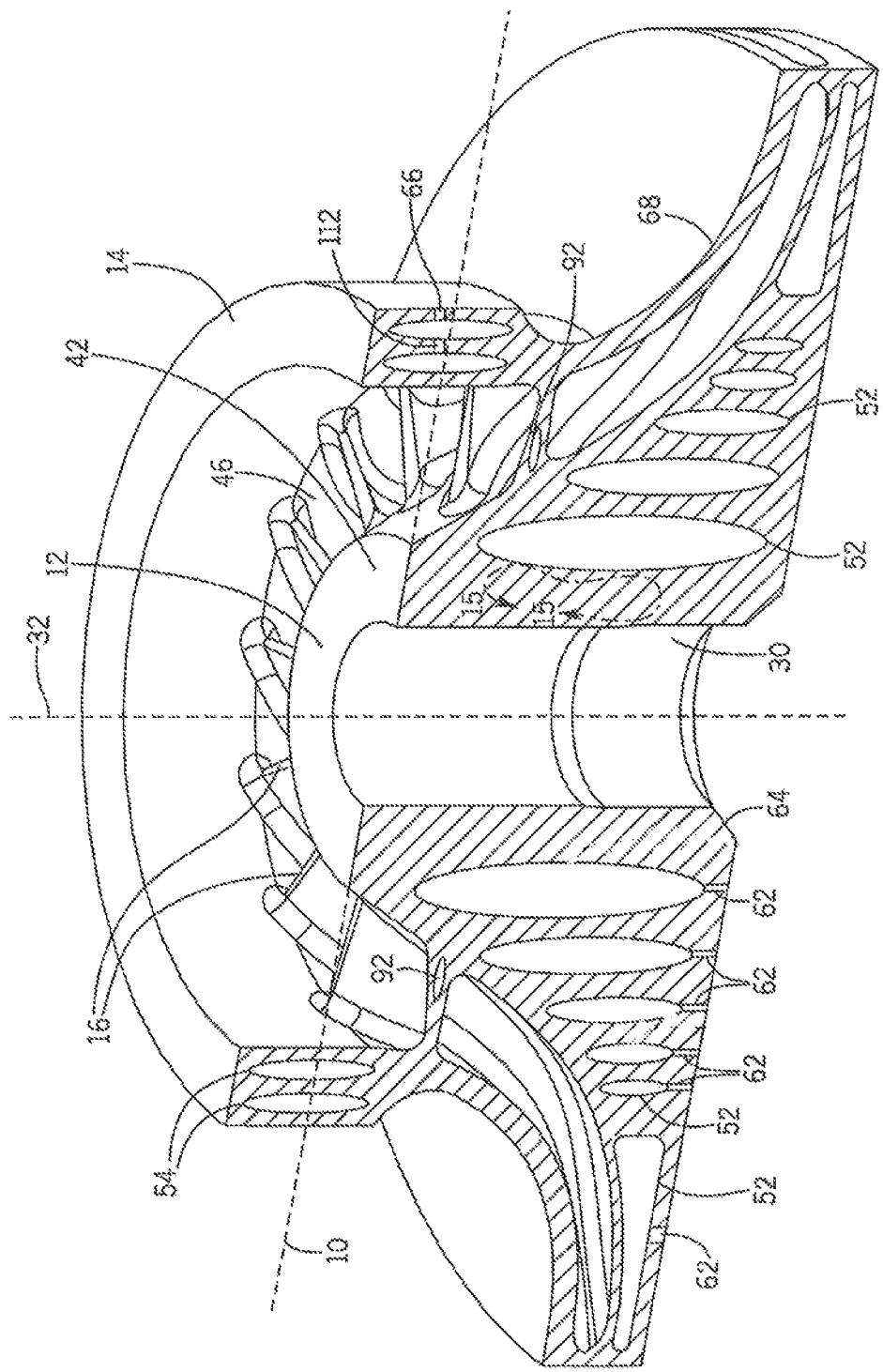
FIG. 4 is a perspective cutaway view along line 2-2 of an embodiment of the monolithic shrouded impeller in FIG. 1.

FIG. 4 is a perspective cutaway view along line 2-2 of the monolithic shrouded impeller 10 in FIG. 1. As illustrated, the hub 12 includes multiple voids 52 that extend axially between the axis 110 of the top surface 42 and the bottom surface 64 of the hub 12. Each of the voids 52 may extend circumferentially around the axis 32 to form an annular shape, or there may be multiple voids 52 (e.g., 2, 3, 4, 5, 6, 7, 8, 9, or 10) circumferentially spaced about the axis 32. The voids 52 include respective apertures 62 that enable excess material to drain from the voids 52. The shroud 14 may also include multiple voids 54. The voids 54 may also extend circumferentially around the axis 32 to form an annular shape, or there may be multiple voids 54 circumferentially spaced about the axis 32. In some embodiments, the voids 54 may be fluidly coupled together with an aperture 112. The aperture 112 enables removal of excess material from the voids 54 through the aperture 66.

FIG. 5 is a top cross-sectional view along line 5-5 of the monolithic shrouded impeller 10. As illustrated, the hub 12, shroud 14, and impeller blades 16 are formed as one piece without an additional joining process (e.g., welding). Moreover, the hub 12, shroud 14, and impeller blades 16 include respective voids 52, 54, and 92. As explained above, the voids 52, 54, and 92 reduce the weight without reducing the structural integrity of the monolithic shrouded impeller 10. In FIG. 5, the shroud 14 includes a single void 54 that extends circumferentially about the axis 32. In contrast, the hub 12 includes multiple voids 52 circumferentially spaced about the axis 32. For example, the hub 12 may include 1, 2, 3, 4, 5, 6, 7, 8, 9, 10, or more voids 52 circumferentially spaced about the axis 32. In other embodiments, the hub 12 and the shroud 14 may include voids 52 and 54 that extend circumferentially about the axis 32 and/or voids 52 and 54 that are circumferentially spaced about the axis 32.

FIG. 6 and FIG. 7 are cross-sectional views of a void 52 in the hub 12, along section line 6-6 of FIG. 5. As illustrated, the void 52 may form different shapes. For example, the void 52 may be circular as illustrated in FIG. 6, or triangular as illustrated in FIG. 7. However, the voids 52 may have many other shapes including square, rectangular, parabolic, and irregular. In some embodiments, the hub 12 may include differently shaped voids 52 spaced circumferentially about the axis 32 (e.g., circular and parabolic voids 52), or one shape (e.g., circular). As explained above, the voids 52 enable production of a lighter monolithic shrouded impeller 10 that does not sacrifice structural integrity. In some embodiments, the voids 52 may include 1, 2, 3, 4, 5, 6, 7, 8, 9, 10, or more supporting ribs 56 that provide structural support. In some embodiments, the supporting ribs 56 may enable larger voids 52, without sacrificing the structural integrity of the monolithic shrouded impeller 10.

Figure 8:
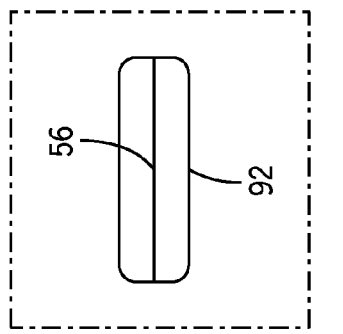
FIG. 8 is a sectional view of an embodiment of a void in a blade along line 8-8 of the monolithic shrouded impeller in FIG. 5.
Figure 9:
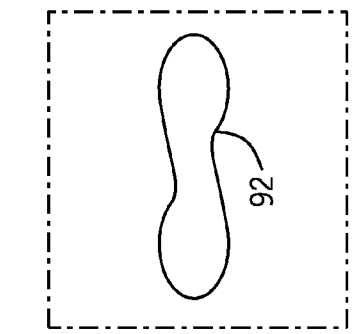
FIG. 9 is a sectional view of an embodiment of a void in a blade along line 8-8 of the monolithic shrouded impeller in FIG. 5.

FIG. 8 and FIG. 9 are cross-sectional views of a void 92 in the impeller blades 16 along line 8-8 in FIG. 5. As illustrated, the void 92 may form different shapes. For example, each void may be symmetrical or asymmetrical; have a uniform or varying cross-section in an axial, radial, and/or circumferential direction; or have a uniform or varying cross-section along the axis of the component (e.g., blade). Some of the void 92 shapes may include circular, triangular, square, rectangular (e.g., FIG. 8), parabolic, and irregular (e.g., FIG. 9). In some embodiments, the void 92 may extend along the length of the impeller blade(s) 16. Embodiments may also include multiple voids 92 that extend the length of an impeller blade, with each void 92 forming the same or a different shape. In still other embodiments, the voids 92 may be intermittently placed along the length of the impeller blade 16. Finally, the voids 92 may include 1, 2, 3, 4, 5, 6, 7, 8, 9, 10, or more supporting ribs 56 that provide the blades 16 with structural support. The supporting ribs 56 may enable larger voids 52 within the impeller blades 16, without sacrificing structural integrity.

Figure 11:
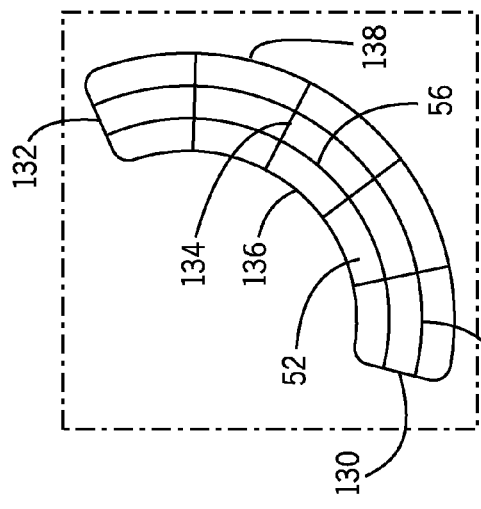
FIG. 11 is a sectional view of an embodiment of a void in a hub along line 10-10 of the monolithic shrouded impeller in FIG. 5.
Figure 10:
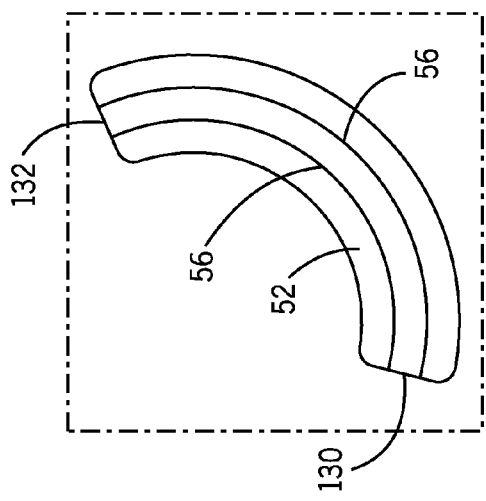
FIG. 10 is a sectional view of an embodiment of a void in a hub along line 10-10 of the monolithic shrouded impeller in FIG. 5.

FIGS. 10 and 11 are cross-sectional views of a void 52 in the hub 12, along section line 10-10 of FIG. 5. As illustrated, the void 52 may form a truncated cylindrical shape. However, in other embodiments the void 52 may form a complete cylindrical shape by extending circumferentially about the axis 32. In FIG. 10 the monolithic shrouded impeller 10 may include one or more ribs 56 (e.g., 1, 2, 3, 4, 5, 6, 7, 8, 9, 10 or more supporting ribs 56) that extend through the void 52. These ribs 56 may have a truncated cylindrical shape and extend from a first radial end 130 to a second radial end 132 of the void 52. In FIG. 11, the truncated cylindrical shaped void 52 may include additional ribs 134 that extend from a radial inner end 136 to a radial outer end 138 of the void 52. The ribs 134 may intersect the ribs 56 to provide additional structural support for the monolithic shrouded impeller 10.

Figure 12:
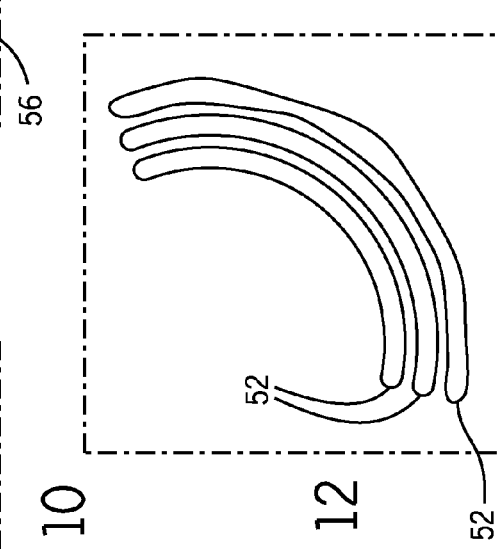
FIG. 12 is a sectional view of an embodiment of a void in a hub along line 10-10 of the monolithic shrouded impeller in FIG. 5.

FIG. 12 is a cross-sectional view of truncated cylindrical shaped voids 52 in the hub 12. As illustrated, each of these voids 52 extends about the hub 12 at a different radius from the axis 32. In some embodiments, the voids 52 may form a complete cylindrical shape by extending circumferentially about the entire axis 32. In other embodiments, the hub 12 may include multiple truncated cylindrical voids 52 circumferentially positioned about the axis 32.

Figure 13:
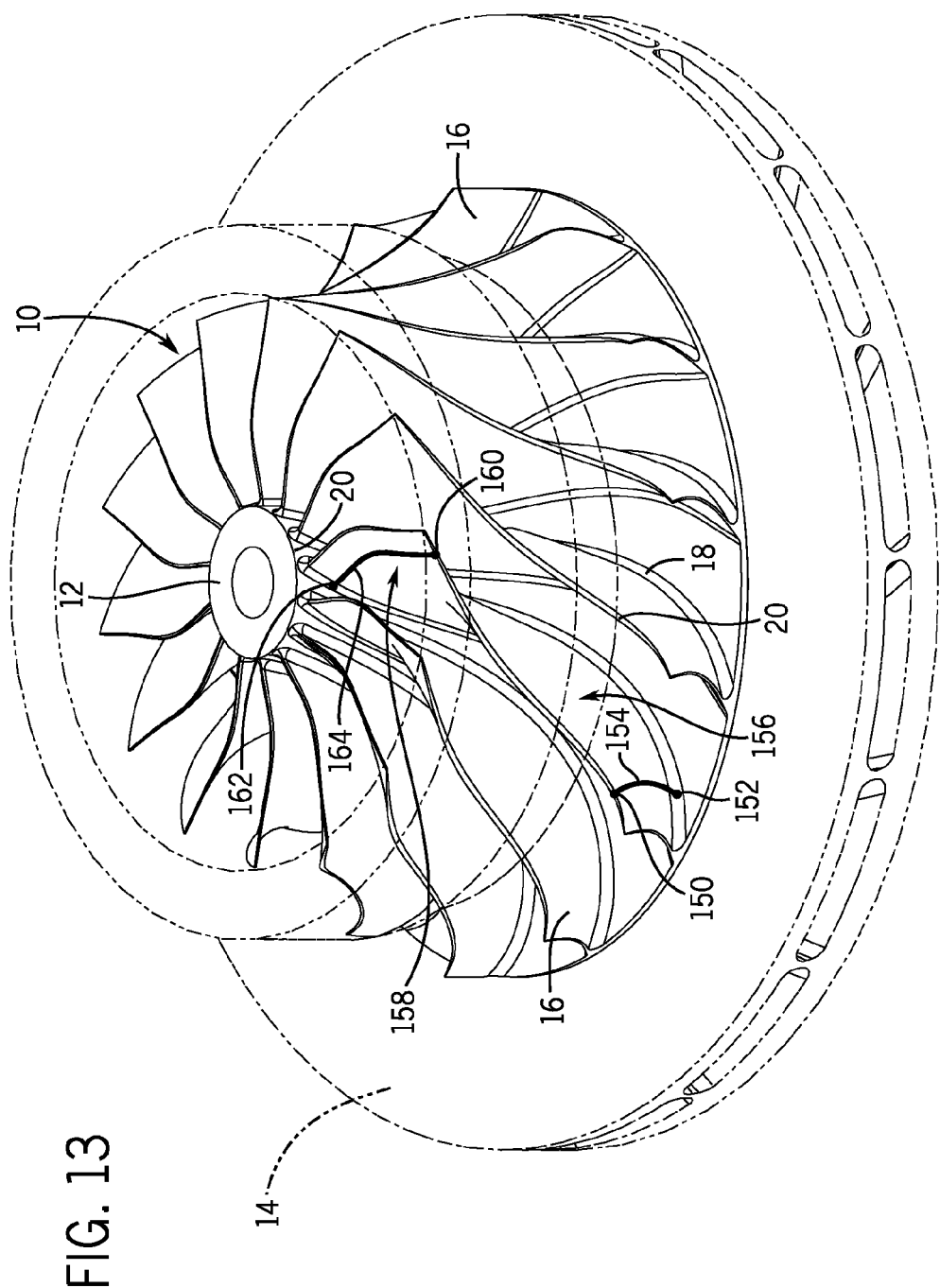
FIG. 13 is a perspective view of an embodiment of an impeller having impeller blades with sculpted surfaces between a shroud intersect surface and a hub intersect surface.

As explained above, the monolithic shrouded impeller 10 may have 3-D blade geometries that may vary in 1, 2, or 3 directions (e.g., radial, axial, and/or circumferential directions). FIG. 13 is a perspective view of an embodiment of a monolithic shrouded impeller having impeller blades 16 with sculpted surfaces between a shroud intersect surface 18 and a hub intersect surface 20. Sculpted impeller blades refers to impeller blades that have at least one surface formed by non-straight lines between corresponding points on the shroud intersect and hub intersect surfaces 18 and 20. More particularly, the sculpted impeller blades 16 are configured to establish three-dimensional surfaces that may particularly match the fluid flow driven by the impeller 10. By contouring the three-dimensional surfaces of the impeller 10 to coincide with fluid flow within the impeller 10, efficiency of the impeller 10 may be increased compared to impellers with ruled mean surface impeller blades (e.g., impeller blades with straight lines between the shroud intersect and hub intersect surfaces 18 and 20).

For example, a point 150 on the shroud intersect surface 18 and a point 152 on the hub intersect surface 20 correspond with one another and are connected by a curved line 154, which forms a portion of a pressure surface 156 of the impeller blade 12. As will be appreciated, curved lines 154 may be formed between all corresponding points on the shroud intersect and hub intersect surfaces 18 and 20 to form the sculpted pressure surface 156. In other embodiments, as described in detail below, curved lines 154 may be formed between some, but not all, of the corresponding points on the shroud intersect and hub intersect surfaces 18 and 20, thereby forming a sculpted portion of the pressure surface 156 and a ruled mean portion of the pressure surface 156. That is, some corresponding points on the shroud intersect and hub intersect surfaces 18 and 20 may be connected with curved lines 154, and some corresponding points may be connected with generally straight lines.

Similarly, a suction surface 158 of each impeller blade 12 may be sculpted. In other words, the suction surface 158 may be formed by curved lines connecting corresponding points on the shroud intersect and hub intersect surfaces 18 and 20. For example, a point 160 on the shroud intersect surface 18 and a point 162 on the hub intersect surface 20 may correspond with one another and be connected by a curved line 164, which forms a part of the suction surface 158. Further, curved lines 164 may be formed between all corresponding points on the shroud intersect and hub intersect surfaces 18 and 18 to form the sculpted suction surface 158. Alternatively, certain embodiments of the impeller blade 12 may include a sculpted portion of the suction surface 158 and a ruled mean portion of the suction surface 158. That is, some corresponding points on the shroud intersect and hub intersect surfaces 18 and 20 may be connected with curved lines 164, and some corresponding points may be connected with generally straight lines.

Furthermore, certain embodiments of the impeller 10 may have impeller blades 16 where the pressure surface 156 is a sculpted surface and the suction surface 158 is a ruled mean surface, or vice versa. For example, in one embodiment, the pressure surface 156 may be formed entirely by curved lines 154 extending between corresponding points on the shroud and hub intersect surfaces 18 and 20, and the suction surface 158 may be formed entirely by generally straight lines (i.e., lines formed by linear interpolation) extending between corresponding points on the shroud and hub intersect surfaces 18 and 20. In such an embodiment, the pressure surface 156 is a sculpted surface and the suction surface 158 is a ruled mean surface. Alternatively, in another embodiment, the pressure surface 156 may be formed entirely by generally straight lines (i.e., lines formed by linear interpolation) extending between corresponding points on the shroud and hub intersect surfaces 18 and 20, and the suction surface 158 may be formed entirely by curved lines 164 extending between corresponding points on the shroud and hub intersect surfaces 18 and 20. In such an embodiment, the pressure surface 156 is a ruled mean surface and the suction surface 158 is a sculpted surface. Accordingly, the curved lines 154 and 164 that form all or a portion of the pressure surface 156 and suction surface 158, respectively, may be designed for specific fluid flow characteristics through the impeller 10, thereby increasing the efficiency and the flow momentum of the impeller 10.

Figure 14:
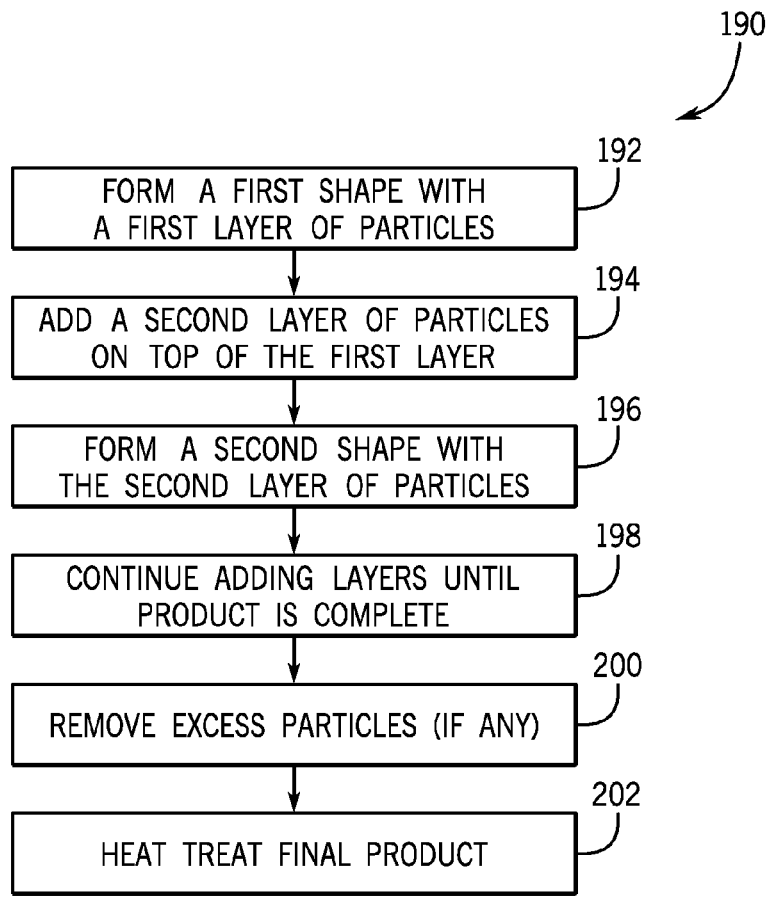
FIG. 14 is a flowchart of an embodiment of a process for producing a monolithic shrouded impeller.

FIG. 14 is a flowchart 190 of an additive manufacturing process (e.g., direct metal laser sintering (DMLS), or digital part materialization (3-D printing)) for producing a monolithic shrouded impeller 10, according to an embodiment. The process may be computer implemented via a controller coupled to machinery (e.g., a laser). For example, the controller may include a user interface, a processor, and a memory with instructions that enable a user to manufacture desired monolithic shrouded impellers. The monolithic shrouded impeller 10 is produced by forming a first shape with a first layer of particles (block 192). For example, a laser may sinter a desired shape into the first layer of particles based on instructions received from the controller. After forming the first layer of metal particles, the process adds a second layer of particles on top of the first layer (block 194). The second layer of metal particles may be the same as or different from the first layer of metal particles. After laying the second layer of metal particles, a second shape is formed with the second layer of particles based on instructions from the controller (block 196). For example, the second layer may be sintered. The process of adding layers continues until the monolithic shrouded impeller 10 is complete (block 198). In some embodiments, the monolithic shrouded impeller 10 may be constructed out of different types of metal particles to increase strength in portions of the monolithic shrouded impeller 10. For example, layers of the monolithic shrouded impeller exposed to high stress, high fatigue, high temperatures, etc. may differ in material type with respect to layers that have low stress, low fatigue, low temperatures, etc. After formation of the monolithic shrouded impeller 10, excess particles (if any) may be removed (block 200). Finally, in some embodiments, the monolithic shrouded impeller 10 may then be heat treated to remove possible stress concentrations between the layers (block 202).

Figure 15:
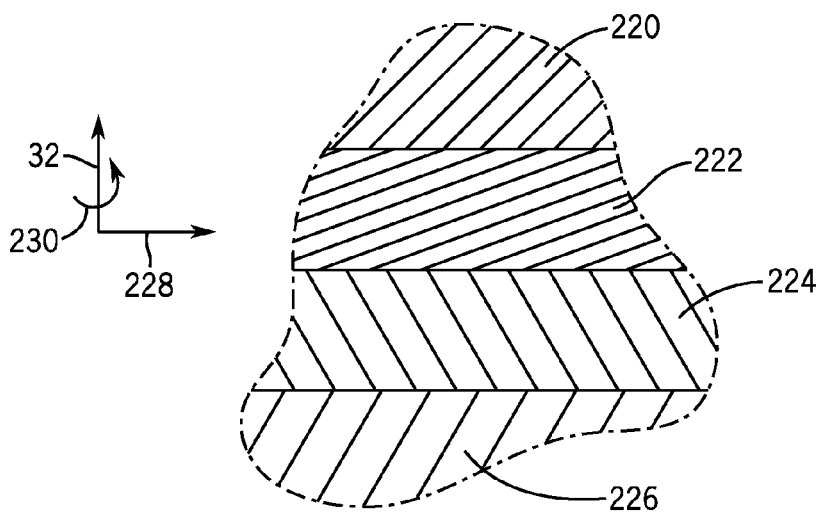
FIG. 15 is a sectional view of the hub within line 15-15 according to an embodiment.

FIG. 15 is a sectional view of the hub within line 15-15 according to an embodiment. As explained above, the monolithic shrouded impeller 10 may be formed by an additive manufacturing process (e.g., direct metal laser sintering, digital part materialization (3-D printing)) that adds one layer on top of another to form a component. In certain embodiments, the monolithic shrouded impeller 10 may include any number of layers that vary (e.g., gradually increase, decrease, or generally change) in material composition, properties (e.g., strength, ductility, porosity, resiliency, stiffness, hardness, wear resistance, erosion resistance, corrosion resistance, coefficient of friction, etc.), dimensions (e.g., layer thickness, width, shape, etc.), orientation of layer stacking (e.g., stacked in radial direction 228, axial direction 32, and/or circumferential direction 230), or any combination thereof. For example, layer 220 may be the weakest, whereas the remaining layers (e.g., 222, 224, 226) may progressively increase in strength, with layer 226 being the strongest. In another embodiment, the monolithic shrouded impeller 10 may have one or more layers along an external surface with a greater wear resistance, erosion resistance, or corrosion resistance relative to internally located layers. By further example, the monolithic shrouded impeller 10 may have one or more layers along a bearing surface, such as a cylindrical aperture 30, with a greater wear resistance and/or a lower coefficient of friction relative to internally located layers. By further example, the monolithic shrouded impeller 10 may have one or more layers along portions of the impeller blades 16 with a greater resiliency, stiffness, strength, wear resistance, erosion resistance, or any combination thereof, relative to other portions of the impeller 10. Furthermore, each impeller blade 16 may vary, via use of multiple layers, in resiliency, stiffness, strength, wear resistance, erosion resistance, or any combination thereof, along the length of the blade 16. In certain embodiments, the layers may gradually increase or decrease in the foregoing characteristics by any incremental value.

Technical effects of the disclosed embodiments of the invention include a monolithic shrouded impeller with increased structural integrity capable of operating more efficiently. The monolithic shrouded impeller may be customizable for specific applications or for a specific machine. Some customization may include complex shapes (e.g., 3-D blade geometries that vary in the radial, axial, and circumferential directions, or lengthwise along the blade); a reduction in weight by including voids in the hub, shroud, and/or the blades; fillets that strengthen the connection of the blades to the hub and shroud; and varying materials in different portions of the monolithic shrouded impeller.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An impeller, comprising:
 a hub body, wherein the hub body includes at least one internal void separate from a shaft aperture;
 a shroud surrounding the hub body;
 a plurality of impeller blades extending from the hub body to the shroud, wherein the hub body, the shroud, and the plurality of impeller blades are a one-piece structure;
 wherein at least one of the plurality of impeller blades comprises at least one internal void;
 a rib extending between opposing internal walls of the hub body through the at least one internal void; and
 wherein the at least one internal void remains devoid of solid material after the one-piece structure is completely formed.

2. The impeller of claim 1, wherein the impeller comprises a plurality of additive layers of material defining the one-piece structure.

3. The impeller of claim 2, wherein the plurality of additive layers of material comprises different layers of different material.

4. The impeller of claim 1, wherein the at least one internal void comprises an annular void that extends circumferentially about an axis of the impeller.

5. The impeller of claim 1, wherein the shroud includes at least one internal void.

6. The impeller of claim 5, wherein the at least one internal void comprises an annular void that extends circumferentially about an axis of the impeller.

7. The impeller of claim 5, wherein the at least one internal void includes a supporting rib, wherein the supporting rib is configured to increase the structural integrity of the impeller.

8. The impeller of claim 1, wherein the at least one internal void extends through a length extending from one distal end toward an opposing distal end of at least one of the plurality of impeller blades.

9. An impeller, comprising:
a hub body;
a shroud surrounding the hub body;
a plurality of impeller blades extending from the hub body to the shroud, wherein the hub body, the shroud, and the plurality of impeller blades are integrated with one another as a one-piece structure; wherein the hub body and/or the shroud, and at least one of the plurality of impeller blades comprises at least one internal void;
at least one supporting rib extending through the at least one of the internal void; and
wherein the at least one internal void remains within the impeller in a final form.

10. The impeller of claim 9, wherein the impeller comprises a plurality of additive layers of material defining the one-piece structure.

11. The impeller of claim 10, wherein the layers extend axially, radially, circumferentially, or a combination thereof.

12. The impeller of claim 10, wherein the plurality of additive layers of material comprises different layers of different material.

13. A method of manufacturing a one-piece shrouded impeller, comprising:
forming a first shape with a first layer of metal particles;
adding additional layers of metal particles on top of the first layer of particles;
forming shapes with each of the additional layers of metal particles until formation of the one-piece shrouded impeller;
wherein forming shapes in the additional layers of metal particles comprises forming one or more internal voids within the one-piece shrouded impeller;
forming a rib through one or more of the internal voids; and
wherein the one or more internal voids are present in the one-piece shrouded impeller after manufacturing processes are complete.

14. The method of claim 13, comprising removing excess metal particles.

15. The method of claim 13, comprising heat treating the one-piece shrouded impeller after formation.

16. An impeller, comprising:
a hub body, wherein the hub body includes at least one internal void separate from a shaft aperture;
a shroud surrounding the hub body;
a plurality of impeller blades extending from the hub body to the shroud, wherein the hub body, the shroud, and the plurality of impeller blades are a one-piece structure;
wherein at least one of the plurality of impeller blades comprises at least one internal void;
a rib extending between opposing internal walls of the hub body through the at least one internal void; and
wherein the at least one internal void comprises an annular void in the hub that extends circumferentially about an axis of the impeller.

17. An impeller, comprising:
a hub body;
a shroud surrounding the hub body;
a plurality of impeller blades extending from the hub body to the shroud, wherein the hub body, the shroud, and the plurality of impeller blades are integrated with one another as a one-piece structure; wherein the hub body and/or the shroud, and at least one of the plurality of impeller blades comprises at least one internal void;
at least one supporting rib extending through the at least one of the internal void; and
wherein the at least one internal void comprises an annular void that extends circumferentially about an axis of the impeller.

18. A method of manufacturing a one-piece shrouded impeller comprising:
forming a first shape with a first layer of metal particles;
adding additional layers of metal particles on top of the first layer of particles;
forming shapes with each of the additional layers of metal particles until formation of the one-piece shrouded impeller;
wherein forming shapes in the additional layers of metal particles comprises forming one or more internal voids within the one-piece shrouded impeller;
forming a rib through one or more of the internal voids; and
removing excess metal particles.

* * * * *